United States Patent Office 3,446,807
Patented May 27, 1969

3,446,807
PROCESS FOR THE PRODUCTION OF SULPHONES
Kuno Wagner, Leverkusen, Germany, assignor to Farbenfabriken Bayer Aktiengesellschaft, Leverkusen, Germany, a corporation of Germany
No Drawing. Filed Nov. 1, 1965, Ser. No. 506,014
Claims priority, application Germany, Dec. 8, 1964,
F 44,637
Int. Cl. C08f *13/06, 7/12;* C07c *147/02*
U.S. Cl. 260—248                                    9 Claims

ABSTRACT OF THE DISCLOSURE

Producing organic sulphones containing at least one sulphone moiety by reacting sulphur dioxide and an ethylenically unsaturated compound having at least one terminal carbon double bond, the reaction being effected in the presence of a formic acid salt of a tertiary organic base or addition compound thereof.

The resulting sulphone or polysulphone products are useful as stabilizers for plastics such as polyoxymethylenes.

---

The invention relates to a process for the production of sulphones and polysulphones by reaction of sulphur dioxide on ethylenically unsaturated compounds in the presence of salts or addition compounds of formic acid.

According to an earlier proposal of the applicants, sulphur dioxide can be reduced to elementary, crystallised sulphur in a reaction which proceeds quickly and smoothly, with the aid of addition products of formic acid, with formic acid salts of tertiary amines or polyamines or with the aid of formic acid salts of numerous tertiary organic nitrogen bases, which salts are dissolved in excess formic acid.

It has now been found that despite the fact that the reduction of the sulphur dioxide to elementary sulphur proceeds extremely quickly, and despite the fact that the intermediate stages of the reduction are very short and cannot be detected analytically, in practice the reaction chain can be intercepted at the formation of intermediate compounds by addition or polyaddition reactions and can be used in advantageous manner for the production of sulphones or polysulphones.

According to the process of the invetnion, sulphur dioxide or gases containing sulphur dioxide, together with the various types of ethylenically unsaturated compounds which contain at least one terminal carbon double bond, (for example vinyl compounds and polyvinyl compounds in formic acid salts of tertiary organic amines or polyamines, or their solutions in excess formic acid) are reacted in liquid addition products of formic acid with formic acid salts of tertiary organic bases at temperatures from —20 to 180° C. and preferably at 40 to 120° C. under normal or increased pressures. In this case, various types of sulphones or polysulphones are obtained in a reaction which proceeds smoothly and, depending on the nature of the vinyl group-containing component being used, without the sulphur dioxide being reduced to elementary sulphur. It is more advantageous to operate in such a way that fresh formic acid is supplied continuously to the mixture at the rate at which carbon dioxide is liberated with the reduction. When the process is carried out in the manner indicated, the reducing agents being used (e.g. the addition compounds of one molecule of trimethylamine or triethylamine and three molecules of formic acid) act as true catalysts, since freshly supplied formic acid is activated on consumption of activated formic acid and is used again for the reduction of the sulphur dioxide to sulphoxylic acid.

According to an earlier proposal of the applicants, addition compounds of formic acid with formic acid salts of tertiary organic bases can be produced by reacting one mol of the tertiary organic base, as such or in the nascent state, with at least three mols of formic acid or formic acid in the nascent state, optionally in an inert medium, the excess formic acid and water being removed by distillation and the addition product being isolated, optionally after a purification by distillation at reduced pressure. Thus, the addition compound of triethylamine and formic acid, which has a constant boiling point at 87° C./15 mm., may consist of one molecule of trimethylamine and three molecules of formic acid. This addition compound not only constitutes a good solvent, but also often a selectively acting reducing agent. The same applies as regards new reducing agents which are based on triethylamine, methyldiethylamine or dimethylethylamine, which likewise form addition compounds of three molecules of formic acid and one molecule of the tertiary base. Furthermore, numerous other organic tertiary bases with molecular weights below 300 are in existence, which bases activate formic acid in the manner indicated above and the formic acid salts of which form addition compounds with formic acid. All these adducts can be used as reducing agents. Salts of quaternary bases undergo a dealkylation, with alkyl formates being split off. Adducts of formic acid with formic acid salts of tertiary organic bases of higher boiling point and with a molecular weight above 300 have a substantially higher boiling point than the first-mentioned addition products defined as consisting of three molecules of formic acid and one molecule of trimethylamine and are decomposed during the distillation.

The following compounds are mentioned as additional examples of tertiary organic bases which, in combination with 2-8 molecules of formic acid per molecule of tertiary base, can be used as reducing agents:

(I) Aliphatic substituted tertiary amines and polyamines, such as diethyl-n-propylamine, dimethylpropylamine, dimethylbutylamine, N-methyldibutylamine, tri-n-butylamine, dimethylstearylamine, permethylated ethylenediamine, permethylated diethylenetriamine and triethylenetraamine, and also permethylated aliphatic amines and polyamines which contain ester groups, ether groups and nitrile groups.

(II) Aliphatic-cycloaliphatically substituted amines and polyamines, such as dimethyl cyclohexylamine, diethyl cyclohexylamine, permethylated and hydrogenated p-phenyldiamine.

(III) Araliphatically substituted amiens, such as dimethylbenzylamine, diethylbenzylamine and di-n-propylbenzlamine.

(IV) Heterocyclic bases, such as pyridine, quinoline, N-methylmorpholine, N-methylpiperidine, N,N'-dimethylpiperazine, endoethylene piperazine and bicyclic amidines, such as those which are obtainable by adding acrylonitrile to pyrrolidone followed by hydrogenation and cyclisation.

The process according to the invention is based on the following simple reaction diagram, which is explained by using acrylamide as the vinyl component:

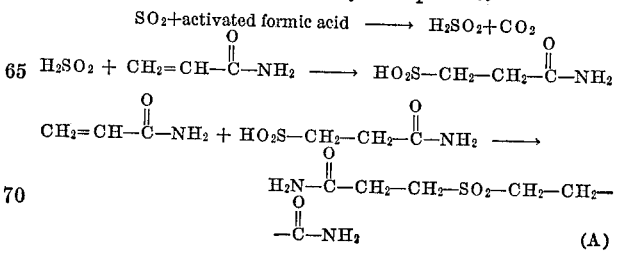

As ethylenically unsaturated compounds which have at least one terminal carbon double bond, it is for example possible to use the following compounds: acrylonitrile, acrylic acid, methacrylic acid, acrylic and methacrylic acid esters.

The ethylenically unsaturated compounds which have at least one terminal carbon double bond can have the following general formula:

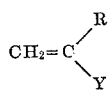

In this formula, R represents hydrogen or a lower alkyl group (preferably 1 to 4 carbon atoms) and Y represents a free carboxyl group, an esterified carboxyl group (preferably 1 to 18 carbon atoms), a carbonamide group, which is obtainally mono- or disubstituted (by alkyl, preferably 1 to 18 carbon atoms, cycloalkyl, preferably 5 or 6 ring carbon atoms, aryl, preferably phenyl and naphthyl, aralkyl, preferably benzyl), a nitrile group, a sulphonic acid group, a sulphonyl alkyl group (preferably 1 to 4 carbon atoms), a sulphonamide (preferably $-SO_2-NH_2$) or sulphonic acid ester group (preferably 1 to 18 carbon atoms) or the group

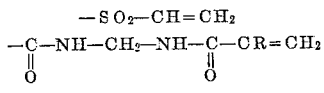

and

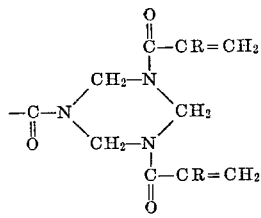

Monosulphones of symmetrical structure are obtained according to the process if sulphur dioxide in the said reducing agents acts on ethylenically unsaturated compounds of the general formula:

$$CH_2=C(R)-X$$

in which R represents a hydrogen atom or a methyl group and X represents a free or esterified carboxyl group (preferably 1 to 18 carbon atoms) an unsubstituted or substituted carboxylic acid amide group, which is optionally mono- or disubstituted (by alkyl, preferably 1 to 18 carbon atoms, cycloalkyl, preferably 5 to 6 ring carbon atoms, aryl, preferably phenyl and naphthyl, aralkyl, preferably benzyl) or a nitrile group. Compounds with several sulphone groups are obtained easily by using vinyl compounds of the general formula $$CH_2=CH-Y$$

in which Y represents a sulphonylmethyl, a sulphonamide radical (preferably $-SO_2NH_2$), a sulphonic acid ester group (preferably 1 to 18 carbon atoms) or if there are used, as staring substances, compounds having 2 or more terminal carbon double bonds of the type $$[CH_2=C(R)]_nZ$$

in which Z represetns (a) a sulphonyl radical, (b) the radical

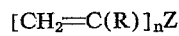

or (c)

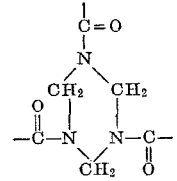

and in the case (a) R must be H and $n$ must be 2, in the case (b) R must be H or methyl and $n$ must be 2 and in the case (c) R must be H and $n$ must be 3.

The following tables show a number of compounds indicated by way of example which can easily be prepared by the process according to the invention from the said unsaturated compounds.

TABLE 1

| Vinyl Compound | Monosulphones | M.p., ° C. |
|---|---|---|
| Type $CH_2=C(R)-X$: | | |
| $CH_2=CH-COOH$ | $HO-\overset{O}{\underset{\|}{C}}-CH_2-CH_2-SO_2-CH_2-CH_2-\overset{O}{\underset{\|}{C}}-OH$ | 220 |
| $CH_2=CH-\overset{O}{\underset{\|}{C}}-NH_2$ | $H_2N-\overset{O}{\underset{\|}{C}}-CH_2-CH_2-SO_2-CH_2-CH_2-\overset{O}{\underset{\|}{C}}-NH_2$ | 228 |
| $CH_2=\underset{CH_3}{\overset{\|}{C}}-\overset{O}{\underset{\|}{C}}-NH_2$ | $H_2N-\overset{O}{\underset{\|}{C}}-\underset{CH_3}{\overset{\|}{CH}}-CH_2-SO_2-CH_2-\underset{CH_3}{\overset{\|}{CH}}-\overset{O}{\underset{\|}{C}}-NH_2$ | 178 |
| $CH_2=CH-\overset{O}{\underset{\|}{C}}-OC_2H_5$ | $C_2H_5O-\overset{O}{\underset{\|}{C}}-CH_2-CH_2-SO_2-CH_2-CH_2-\overset{O}{\underset{\|}{C}}-OC_2H_5$ | 86 |
| $CH_2=CH-CN$ | $NC-CH_2-CH_2-SO_2-CH_2-CH_2-CN$ | 86-87 |

TABLE 2

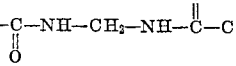

[1] Insoluble, x=number of structural elements.

The process according to the invention, however, not only permits the formation of sulphones of symmetrical structure. It is in fact also possible to form sulphones of unsymmetrical structure and particularly polysulphones having a low molecular weight, for example, by reacting sulphur dioxide in a large excess in a first phase on for example acrylic acid or acrylamide, predominantly the organic sulphinic acids being formed at temperatures up to about 40° C. In a second phase, a trifunctional vinyl compound such as triacrylformal is then for example progressively supplied, the sulphinic acid adding thereto. By this method of procedure, the formation and particularly the nature of the terminal groups in the polysulphones which are obtained can be varied within wide limits depending on the intended purpose of use.

The process according to the invention is carried out in reducing agents containing activated formic acid. The process is conducted with particular advantage in addition products of tertiary nitrogen bases, e.g. in trimethylamine or triethylamine, with 3 molecules of formic acid, since these molecular compounds represent liquids which often have a high dissolving power for difficulty soluble compounds. However, it is also readily possible successfully to use 1:1 salts of formic acid with tertiary bases, either in a molten state or dissolved in formic acid or dimethyl formamide, methyl formamide or formamide. The reactions can proceed in the presence or absence of water and if necessary in the presence of organic solvents, if the solubility of the vinyl compounds, sulphinic acids and polysulphones in the reducing agents is not sufficiently strong.

When carrying out the process according to the present invention, the reaction components are generally so reacted that 1 mol of sulphur dioxide acts on 2 mols of the vinyl compound. It may however be advantageous to us the unsaturated compound in an excess of 3 to 4 mols, this always being so when the addition velocity of the primarily forming organic sulphinic acids on the vinyl compound is low. In general, with additions which proceed satisfactorily, temperatures from 80 to 110° C. are used. The reduction of the sulphur dioxide to the sulphoxylic acid stage on the basis of the quantity of carbon dioxide split off is controlled with a gas meter. Premature homopolymerisation reactions of the unsaturated monomers being introduced are prevented by stabilizers, such as phenthiazine, hydroquinone, resorcinol and others.

The process according to the invention has the following advantages by comparison with known processes for the production of sulphones:

It offers starting materials which are readily available and inexpensive to produce and it represents a direct process (one-pot process). Intermediate stages such as the production of sulphides, oxidation to sulphoxides and sulphones in further processing steps are avoided, as is also the production of unstable sulphinic acids. Finally, the costly isolation of the sulphoxylic acid as a zinc or cobalt salt or as sodium hydroxymethane sulphinate (Rongalite) is also avoided, since with the process according to the invention, a highly reactive sulphoxylic acid in the state of formation is used in the reaction.

The sulphones and polysulphones which are obtained are valuable starting materials for further synthesis reactions; polysulphones which contain amide groups and sulphur are valuable stabilisers for plastics and especially for polyoxymethylenes and also for copolymers of trioxane with conventional comonomers of cyclic ethers, formals and mercaptals, etc. The polysulphones of high molecular weight can be used in the plastics industry.

The following examples illustrate the invention:

EXAMPLE 1

197 parts by weight of the liquid addition product of 3 molecules of formic acid and 1 molecule of trimethylamine (B.P. 87° C./15 mm.) were initially placed in a three-necked spherical flask which is provided with a stirrer device, reflux condenser and dropping funnel, the reflux condenser being connected to a gas meter, and 71 parts by weight of acrylamide and 0.5 part by weight of phenthiazine were dissolved therein. The internal temperature of the reduction mixture was raised to 90–100° C. and, at this temperature, there was initiated the introduction of 32 parts by weight of sulphur dioxide, carried out within 3 hours. The evolution of $CO_2$ started immediately. Proportionately with the quantity of gas indicated by the gas meter, fresh concentrated formic acid was added dropwise to the mixture. On completion of the reduction, about 15 litres of $CO_2$ had been liberated. After cooling the reaction mixture overnight, the resulting compound

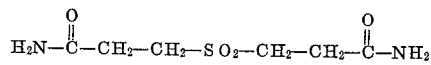

crystallised out in almost analytically pure form with a yield of about 60%, calculated on the acrylamide. On being recrystallised from water, it melted at 228° C. By concentrating the mother liquor by evaporation in vacuo and recrystallising the residue from water, additional quantities of the sulphone could be obtained. Total yield: 65 parts by weight, about 63% of the theoretical.

EXAMPLE 2

200 parts by weight of ethylacrylate are reacted according to Example 1 in 197 parts by weight of the addition product of 3 molecules of formic acid and 1 molecule of trimethylamine with 64 g. of sulphur dioxide over a period of 5 hours at 98° C. After cooling the reaction mixture and after standing for 48 hours, the contents of the flask had solidified into a matted crystal magma. This was taken up in 1800 parts by weight of water, filtered and there was obtained a crude yield of 168 parts by weight of the compound

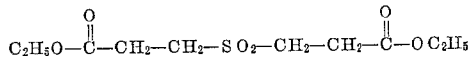

recrystallised from water; the compound melted at 86° C. Sulphur-containing compounds of unknown constitution were formed during the reaction in a yield of about 40%.

EXAMPLE 3

144 parts by weight of acrylic acid and 0.5 part by weight of phenthiazine were dissolved in 197 parts by weight of the addition product of 3 molecules of formic acid and 1 molecule of triethylamine and, as described in Example 1, were reacted at about 100° C. with 64 parts by weight of sulphur dioxide. After cooling, the reaction mixture was concentrated in water jet vacuum and resinous products were taken up in 600 parts by volume of normal hydrochloric acid and heated to 80° C. Crystallisation starts when the solution was cooled. There was obtained the compound

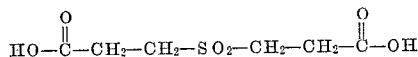

After crystallisation from water, the dicarboxylic acid melted at 220–221° C. with decompositition. Yield: 110 parts by weight.

EXAMPLE 4

100 parts by weight of methylvinyl sulphone, 0.5 part by weight of phenthiazine and 200 parts by weight of formic acid were dissolved in 239 parts by weight of the addition product of 3 molecules of formic acid and 1 molecule of triethylamine and, as described in Example 1, were reacted at about 100° C. with 32 parts by weight of sulphur dioxide. After a short time, there was progressive deposition of the difficultly soluble trisulphone, which precipitated in almost analytically pure form as crystal needles with a silk-like lustre. After completing the introduction of $SO_2$ and after about 17 litres of $CO_2$ had escaped from the reaction mixture, the thoroughly crystallised contents of the flask were taken up in water and, filtered off. Further quantities of the sulphone could be recovered from the mother liquor. Yield: 105 parts by weight. The resulting trisulphone of the formula $$CH_3-SO_2-CH_2-CH_2-SO_2-CH_2-CH_2-SO_2-CH_3$$

melted at 268° C. when recrystallised from formic acid.

EXAMPLE 5

106 parts by weight of acrylonitrile and 0.6 part by weight of phenthiazine were dissolved in a mixture of 20 parts by weight of formic acid and 239 parts by weight of an addition product of triethylamine and formic acid (1:3). In accordance with Example 1, 64 parts by weight of sulphur dioxide were introduced at 60° C. into the reaction mixture. After completing the reaction, the reaction mixture was taken up in 1500 parts by volume of water. After 2 days, crystals having a silk-like lustre were precipitated. The compound of the formula $$NC-CH_2-CH_2-SO_2-CH_2-CH_2-CN$$

was formed and had a melting point of 86° C. Yield: 30 parts by weight. On concentration of the mother liquor, a mixture of different sulphur-containing compounds was obtained on account of the saponification reactions and other changes of the non-added organic sulphinic acid.

EXAMPLE 6

170 parts by weight of methacrylamide and 0.6 part by weight of phenthiazine wre dissolved in 197 parts by weight of the addition product of 1 molecule of trimethylamine and 3 molecules of formic acid. At 100° C., 64 parts by weight of sulphur dioxide were introduced into the mixture. After 5 hours, the almost clear reaction mixture was cooled and diluted with 500 parts by volume of water. Slow crystallisation was initiated and there is obtained the compound

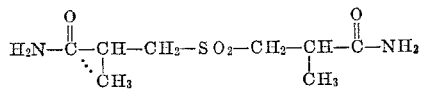

which melted at 175° C. when recrystallised from water. Yield: 30 parts by weight. After working up the mother liquor, mainly conversion products of the primarily formed sulphinic and sulphenic acids are obtained.

EXAMPLE 7

20 parts by weight of sulphur dioxide were introduced while stirring well and at a temperature of 100–105° C. into a concentrated solution of 0.5 part by weight of phenthiazine and 53 parts by weight of methylene-bis-acrylamide in 53 parts by weight of the addition compound of 3 molecules of formic acid and 1 molecule of trimethylamine. After removing the solvent in vacuo, there was obtained an insoluble reaction product, which was extracted by boiling for several hours with acetone and was hereby freed from formic acid and trimethylamine. The polysulphone of high molecular weight which was obtained was insoluble in all conventional organic solvents. Yield: 67 parts by weight.

EXAMPLE 8

62 parts by weight of triacrylformal and 1 part by weight of phenthiazine were dissolved in 239 parts by weight of the addition product of 3 molecules of formic acid and 1 molecule of triethylamine at 100° C. At 100° C. 25 parts by weight of sulphur dioxide were introduced There was immediate precipitation of a crosslinked polysulphone. After completing the introduction of the sulphur dioxide, the reaction mixture was diluted with water and filtered, and the filter residue is extracted with acetone and dried. There is obtained a yield of 98 parts by weight of a crosslinked polysulphone which was insoluble in all solvents.

What I claim is:

1. In a process for producing sulphones or polysulphones by reacting sulphur dioxide with vinyl compounds or polyvinyl compounds having a terminal carbon double bond; the improvement consisting of effecting this reaction with $SO_2$ in the presence of a liquid selected from the group consisting of
   (A) formic acid salt of a tertiary organic amine or polyamine base, and
   (B) an addition compound of formic acid with (A); effecting the reaction at a temperature of about −20° C. to 180° C.

2. A process as claimed in claim 1, wherein the reaction is effected in the presence of an addition product, of one molecule of triethylamine and 3 molecules of formic acid.

3. A process of claim 1, wherein the reaction is carried out in the presence of an addition product, of about one molecule of trimethylamine and 3 molecules of formic acid.

4. A process of claim 1, wherein the vinyl compound is a member selected from the group consisting of acrylonitrile, acrylic acid, methacrylic acid, acrylic acid amide, methacrylic acid amide and the corresponding esters of acrylic- and methacrylic acid.

5. A process of claim 1, wherein the vinyl compound is a member selected from the group consisting of vinylmethyl-sulphone.

6. A process of claim 1, wherein the polyvinyl compound is a divinyl compound selected from the group consisting of methylen-bis-acrylo-amide, methylen-bis-methaacrylo-amide and divinyl sulphone.

7. A process of claim 1, wherein the polyvinyl compound is a trivinyl compound selected from the group consisting of N,N′,N″-triacrylolyl-hexahydro triazine.

8. A process of claim 1, weherein about 1 mol of sulphur dioxide is reacted with 2 to 4 mols of the ethylenically unsaturated compound.

9. A process of claim 1, wherein excess sulphur dioxide is reacted in a first stage with a monovinyl compound and the product obtained is reacted in a second stage with a trivinyl compound.

References Cited

UNITED STATES PATENTS

| | | | |
|---|---|---|---|
| 2,615,889 | 10/1952 | Zerner et al. | 260—248 |
| 2,993,932 | 7/1961 | Beachem et al. | 260—561 |
| 3,012,015 | 12/1961 | Sunden et al. | 260—248 |

FOREIGN PATENTS

| | | |
|---|---|---|
| 1,122,941 | 1/1962 | Germany. |

HENRY R. JILES, *Primary Examiner.*

JOHN M. FORD, *Assistant Examiner.*

U.S. Cl. X.R.

260—45.8, 45.85, 45.9, 465.8, 481, 513, 537, 561, 607